United States Patent
Yasugi et al.

(10) Patent No.: US 11,196,993 B2
(45) Date of Patent: Dec. 7, 2021

(54) IMAGE CODING APPARATUS AND IMAGE DECODING APPARATUS

(71) Applicant: SHARP KABUSHIKI KAISHA, Sakai (JP)

(72) Inventors: Yukinobu Yasugi, Sakai (JP); Eiichi Sasaki, Sakai (JP); Tomohiro Ikai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/998,480

(22) Filed: Aug. 20, 2020

(65) Prior Publication Data

US 2021/0067774 A1    Mar. 4, 2021

(30) Foreign Application Priority Data

Aug. 28, 2019   (JP) .............................. JP2019-156127

(51) Int. Cl.
| | |
|---|---|
| *H04N 19/00* | (2014.01) |
| *H04N 19/117* | (2014.01) |
| *H04N 19/184* | (2014.01) |
| *H04N 19/186* | (2014.01) |
| *H04N 19/176* | (2014.01) |

(52) U.S. Cl.
CPC ......... *H04N 19/117* (2014.11); *H04N 19/176* (2014.11); *H04N 19/184* (2014.11); *H04N 19/186* (2014.11)

(58) Field of Classification Search
CPC .. H04N 19/117; H04N 19/176; H04N 19/184; H04N 19/186
See application file for complete search history.

(56) References Cited

U.S. PATENT DOCUMENTS

| | | | | |
|---|---|---|---|---|
| 2016/0105685 | A1* | 4/2016 | Zou ..................... | H04N 19/186 |
| | | | | 375/240.12 |
| 2018/0063527 | A1* | 3/2018 | Chen ................... | H04N 19/635 |
| 2018/0359480 | A1* | 12/2018 | Xiu ....................... | H04N 19/85 |
| 2020/0260120 | A1* | 8/2020 | Hanhart ............... | H04N 19/82 |
| 2021/0044834 | A1* | 2/2021 | Li ........................ | H04N 19/176 |

OTHER PUBLICATIONS

Benjamin Bross et al., "Versatile Video Coding (Draft 6)", JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019.

* cited by examiner

*Primary Examiner* — Zhihan Zhou
(74) *Attorney, Agent, or Firm* — ScienBiziP, P.C.

(57) ABSTRACT

An image decoding apparatus includes: a first filter unit configured to apply a first filter to an image (a luminance image and a chrominance image); a second filter unit configured to apply a second filter to an output image of the first filter; a filter set derivation unit configured to decode a filter coefficient from coded data; and a third filter unit configured to apply a third filter to an output image of the second filter by using the filter coefficient. In a case that the third filter unit performs filter processing for the luminance image by using a luminance output image of the second filter, the third filter unit performs processing of clipping an amount of change of a pixel value through the filter processing within a prescribed range of value.

3 Claims, 12 Drawing Sheets

(a)
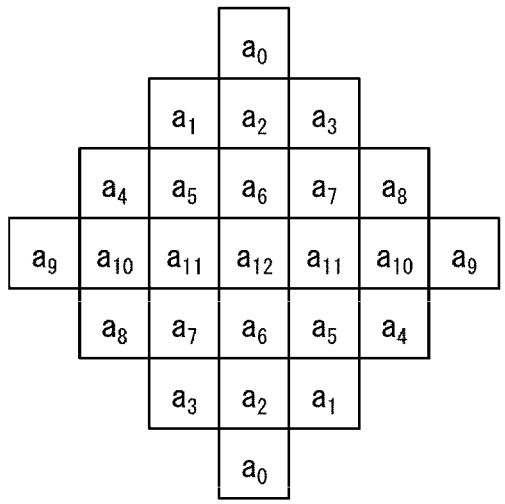
(b)
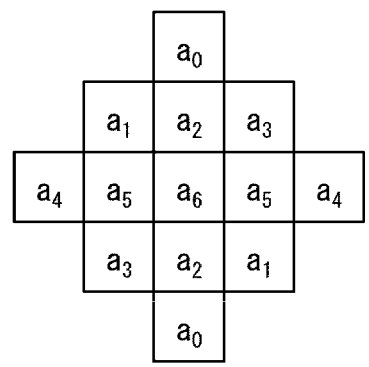
(c)
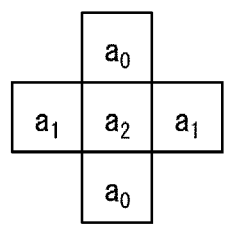
(d)
(e)
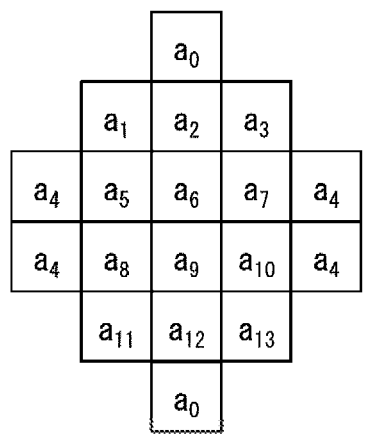
FIG. 10

| alf_data( adaptation_parameter_set_id ) { | Descriptor |
|---|---|
|   alf_luma_filter_signal_flag | u(1) |
|   alf_chroma_filter_signal_flag | u(1) |
|   ... | |
|   if( alf_chroma_filter_signal_flag ) { | |
|     alf_chroma_clip_flag | u(1) |
|     for( j = 0; j < 6; j++ ) { | |
|       alf_chroma_coeff_abs[ j ] | ue(3) |
|       if( alf_chroma_coeff_abs[ j ] > 0 ) | |
|         alf_chroma_coeff_sign[ j ] | u(1) |
|     } | |
|     if( alf_chroma_clip_flag ) { | |
|       for( j = 0; j < 6; j++ ) { | |
|         if( alf_chroma_coeff_abs[ j ] ) | |
|           alf_chroma_clip_idx[ j ] | ue3(v) |
|       } | |
|     for( j = 0; j < 3; j++ ) { | |
|       alf_cross_component_coeff_abs[ j ] | ue3(v) |
|       if( alf_chroma_luma_coeff_abs[ j ] > 0 ) | |
|         alf_cross_component_coeff_sign[ j ] | u(1) |
|     } | |
|     } | |
|   } | |
| } | |

⎤SYN01 (bracketing the alf_cross_component rows)

FIG. 11

IMAGE CODING APPARATUS AND IMAGE DECODING APPARATUS

CROSS-REFERENCE TO RELATED APPLICATIONS

This application claims the benefit of priority to Japanese Patent Application Number 2019-156127 filed on Aug. 28, 2019. The entire contents of the above-identified application are hereby incorporated by reference.

BACKGROUND

Technical Field

Embodiments of the present disclosure relate to an image decoding apparatus and an image coding apparatus.

A video coding apparatus which generates coded data by coding a video, and a video decoding apparatus which generates decoded images by decoding the coded data are used for efficient transmission or recording of videos.

Examples of specific video coding schemes include schemes proposed in H.264/AVC and High-Efficiency Video Coding (HEVC).

In such a video coding scheme, images (pictures) constituting a video are managed in a hierarchical structure including slices obtained by splitting an image, Coding Tree Units (CTUs) obtained by splitting a slice, units of coding (which will be referred to as Coding Units (CUs)) obtained by splitting a coding tree unit, and Transform Units (TUs) which are obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (an inter-prediction) and an intra-picture prediction (intra prediction). There is a technique in which image quality of a reference image to be used for generation of the prediction image is enhanced by using a loop filter so as to enhance image quality of a decoded image without increasing a code amount.

As technologies for coding and decoding a video in recent years, there are technologies described in "Versatile Video Coding (Draft 6)", JVET-O2001-vE, Joint Video Exploration Team (JVET) of ITU-T SG 16 WP 3 and ISO/IEC JTC 1/SC 29/WG 11. Specifically, technologies in which a loop filter is applied through filter processing of multiple stages such as a deblocking filter, a sample offset filter (SAO), and an adaptive loop filter (ALF) are known.

There is a known technique in which, in a loop filter for a certain color component, an image of another color component is referred to.

SUMMARY

However, in the methods described in "Versatile Video Coding (Draft 6)", JVET-O2001-vE, Joint Video Exploration Team (JVET) of ITU-T SG 16 WP 3 and ISO/IEC JTC 1/SC 29/WG 11, there is a problem that processing for a chrominance image is less adequate than that for a luminance image in a loop filter. There is also a problem intermediate images requires a large amount of memory to store in a case that loop filter processing for a chrominance image is performed by referring to a luminance image.

An image decoding apparatus according to one aspect of the present disclosure includes: a first filter unit configured to apply a first filter to an image (a luminance image and a chrominance image); a second filter unit configured to apply a second filter to an output image of the first filter; a filter set derivation unit configured to decode a filter coefficient from coded data; and a third filter unit configured to apply a third filter to an output image of the second filter by using the filter coefficient, wherein the third filter unit performs filter processing for the chrominance image by using a luminance output image of the second filter, the third filter unit performs the filter processing for the chrominance image by limiting an amount of change of a pixel value through third filter processing within a prescribed range in the chrominance image.

In the image decoding apparatus according to one aspect of the present disclosure, the third filter changes the prescribed range used to limit the amount of change for each of pixels to be filtered.

In the image decoding apparatus according to one aspect of the present disclosure, the third filter changes the prescribed range used to limit the amount of change according to a slice type of a slice to which each of the pixels to be filtered belongs.

In the image decoding apparatus according to one aspect of the present disclosure, the third filter changes the prescribed range used to limit the amount of change according to a slice type of a slice to which each of the pixels to be filtered belongs.

In the image decoding apparatus according to one aspect of the present disclosure, the third filter changes the prescribed range used to limit the amount of change according to a bit depth of each of the pixels to be filtered.

An image coding apparatus according to one aspect of the present disclosure includes: a first filter unit configured to apply a first filter to an image (a luminance image and a chrominance image); a second filter unit configured to apply a second filter to an output image of the first filter; a coding parameter determination unit configured to derive a filter coefficient; and a third filter unit configured to apply a third filter to an output image of the second filter by using the filter coefficient, wherein the third filter unit performs filter processing for the luminance image by using a luminance output image of the second filter, and in a case that the third filter unit performs filter processing for the chrominance image by using the luminance output image of the second filter, the third filter unit performs the filter processing for the chrominance image by limiting an amount of change of a pixel value through third filter processing within a prescribed range in the chrominance image.

According to one aspect of the present disclosure, in image coding and decoding processing, by increasing filter information of chrominance to be signaled and referring to a luminance image as well as a chrominance image, image quality of the chrominance image can be enhanced with a reduced amount of memory to be used.

BRIEF DESCRIPTION OF DRAWINGS

The disclosure will be described with reference to the accompanying drawings, wherein like numbers reference like elements.

FIG. 10 is a diagram illustrating shapes of loop filters according to the present disclosure.

FIG. 11 is a diagram illustrating syntax of a loop filter according to the present disclosure.

DESCRIPTION OF EMBODIMENTS

First Embodiment

Hereinafter, embodiments of the present disclosure will be described with reference to the drawings.

Figure 1:
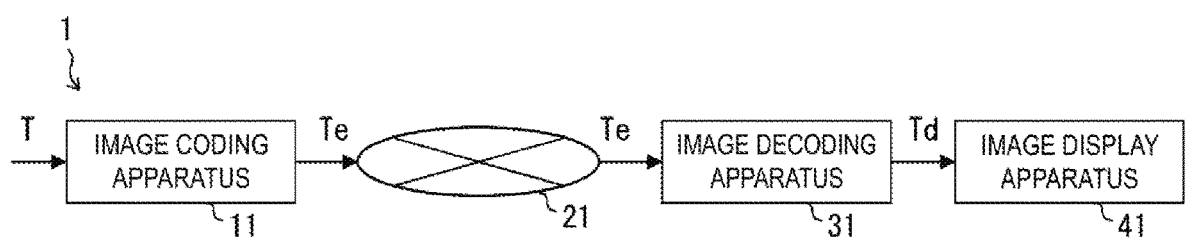
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting or the like. The network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or each of multiple decoded images Td.

The video display apparatus 41 displays all or part of the one or multiple decoded images Td generated by the video decoding apparatus 31. For example, the video display apparatus 41 includes a display device such as a liquid crystal display and an organic Electro-luminescence (EL) display. Examples of the display include a stationary display, a mobile display, and an HMD. In a case that the video decoding apparatus 31 has a high processing capability, an image having high image quality is displayed, and in a case that the video decoding apparatus 31 has a lower processing capability, an image which does not require as high a processing capability and display capability as above is displayed.

Operator

Operators used in the present specification will be described below.

\>\> represents a right bit shift, << represents a left bit shift, & represents a bitwise AND, | represents a bitwise OR, |= represents an OR assignment operator, and || represents logical sum.

x?y:z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs(a) is a function that returns an absolute value of a.

Int(a) is a function that returns an integer value of a.

floor(a) is a function that returns a maximum integer less than or equal to a.

ceil(a) is a function that returns a minimum integer greater than or equal to a.

a/d represents division of a by d (the quotient is rounded to the nearest decimal point).

x . . . y represents a set of integers that are greater than or equal to x and less than or equal to y. Alternatively, x . . . y indicates that prescribed processing is repeatedly performed on integers that are greater than or equal to x and less than or equal to y.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
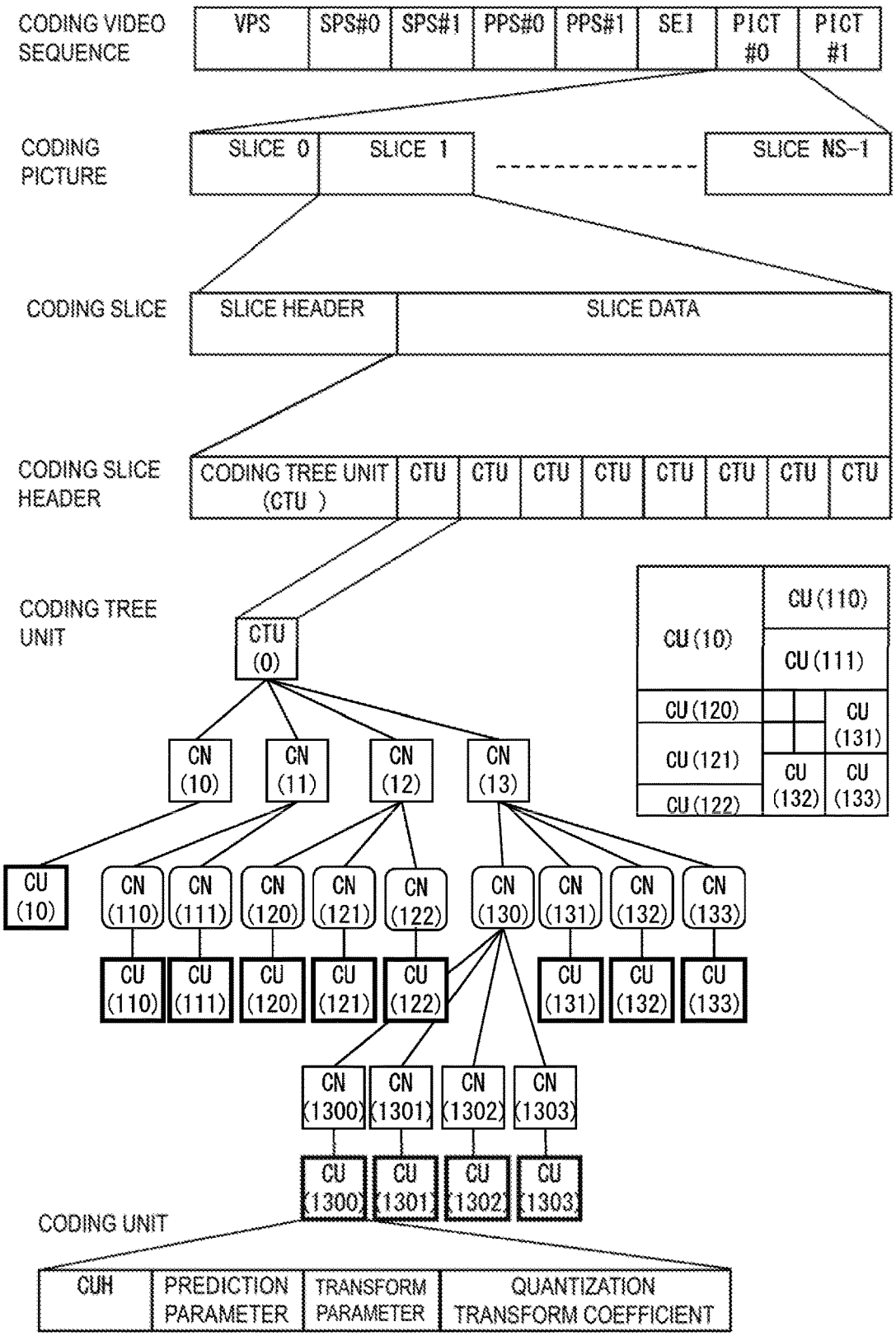
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIG. 4 is a diagrams illustrating a coding video sequence defining a sequence SEQ, a coding picture prescribing a picture PICT, a coding slice prescribing a slice S, a coding slice data prescribing slice data, a coding tree unit included in the coding slice data, and a coding unit included in each coding tree unit.

Coding Video Sequence

In the coding video sequence, a set of data referred to by the video decoding apparatus 31 to decode the sequence SEQ to be processed is defined. As illustrated in FIG. 4, the sequence SEQ includes a Video Parameter Set, a Sequence Parameter Set SPS, a Picture Parameter Set PPS, an Adaptation Parameter Set APS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

In the adaptation parameter set APS, a set of coding parameters referred to by the video decoding apparatus 31 to decode each slice in a target sequence is defined. For example, parameters (filter coefficient, clipping value) of the ALF used for decoding of a picture are included. Note that multiple APSs may exist, and information for selecting any one of the multiple APSs is signaled in each slice header. Regarding the APS, multiple pictures can share the same APS. A certain APS may be referred to by its succeeding multiple pictures. In a case that a certain picture includes multiple slices, such different slices may refer to different APSs.

A color format of a picture may be a color format of Y, Cb, and Cr, a color format of R, G, and B, or another color format. Sampling for each color component may be different from one another. For example, as ratios of sampling numbers of the first color component, the second color component, and the third color component, the following shows a horizontal ratio SubWidthC and a vertical ratio SubHeightC of the first and second colors and the third color component. For example, the following shows cases for 4:4:4, 4:2:2, and 4:2:0.
4:2:0, SubWidthC=2, SubHeightC=2
4:2:2, SubWidthC=2, SubHeightC=1
4:4:4, SubWidthC=1, SubHeightC=1
The video coding apparatus 11 and the video decoding apparatus 31 may code and decode chroma_format_idc.
chroma_format_idc=0, 4:0:0 (monochrome)
chroma_format_idc=1, 4:2:0
chroma_format_idc=2, 4:2:2
chroma_format_idc=3, 4:4:4
Coding Picture In the coding picture, a set of data referred to by the video decoding apparatus 31 to decode the picture PICT to be processed is defined. As illustrated in FIG. 4, the picture PICT includes slice 0 to slice NS−1 (NS is the total number of slices included in the picture PICT).

Note that in a case that it is not necessary to distinguish each of slice 0 to slice NS−1 below, subscripts of reference signs may be omitted. The same applies to other data with subscripts included in the coding stream Te which will be described below.
Coding Slice In the coding slice, a set of data referred to by the video decoding apparatus 31 to decode the slice S to be processed is defined. As illustrated in FIG. 4, the slice includes a slice header and a slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that inter prediction is not limited to uni-prediction and bi-prediction, and the prediction image may be generated by using a larger number of reference pictures. The term "P slice" or "B slice" hereinafter refers to a slice including a block to which the inter prediction is applied.

Note that, the slice header may include a reference (pic_parameter_set_id) to the picture parameter set PPS.
Coding Slice Data In the coding slice data, a set of data referred to by the video decoding apparatus 31 to decode the slice data to be processed is defined. As illustrated in FIG. 4, the slice data includes CTUs. A CTU is a block of a fixed size (for example, 64×64) constituting a slice, and may be called a Largest Coding Unit (LCU).
Coding Tree Unit In FIG. 4, a set of data referred to by the video decoding apparatus 31 to decode the CTU to be processed is defined. The CTU is split into coding units CU, each of which is a basic unit of coding processing, by recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as a highest coding node.

In a case that the size of the CTU is 64×64 pixels, the size of the CU may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.
Coding Unit In FIG. 4, a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

Prediction processing may be performed in each CU, or may be performed in each sub-CU, which is a unit obtained by further splitting the CU. In a case that the size of the CU and the size of the sub-CU are the same, there is only one sub-CU in a CU. In a case that the size of the CU is larger than the size of the sub-CU, the CU is split into sub-CUs. For example, in a case that the CU has a size of 8×8 and the sub-CU has a size of 4×4, the CU is split into four sub-CUs, which are obtained by two horizontal splits and two vertical splits.

The prediction has two types (prediction modes), that is, an intra prediction and an inter prediction. The intra prediction refers to a prediction in an identical picture, and the inter prediction refers to prediction processing performed between different pictures (for example, between pictures of different display times, and between pictures of different layer images).

Although the transform and quantization processing is performed in each CU, the quantization transform coefficient may be entropy coded in each subblock having a size of 4×4 or the like.

Prediction Parameter

The prediction image is derived by using the prediction parameter that is added to the block. The prediction parameter includes prediction parameters for the intra prediction and the inter prediction.

Configuration of Video Decoding Apparatus

Figure 5:
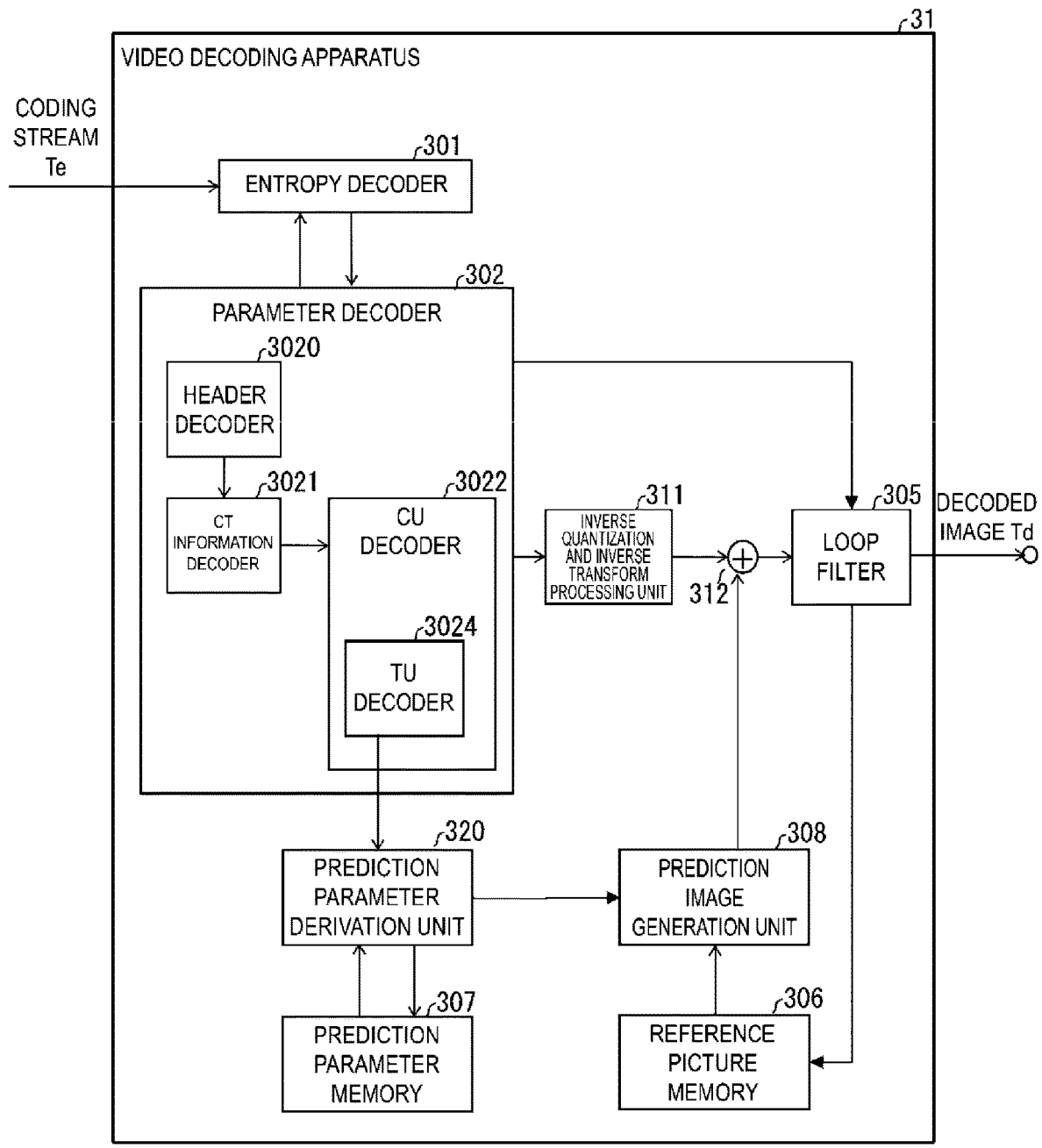
FIG. 5 is a schematic diagram illustrating a configuration of the video decoding apparatus.

Next, a configuration of the video decoding apparatus 31 (FIG. 5) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that, in accordance with the video coding apparatus 11 to be described later, a configuration that the video decoding apparatus 31 does not include the loop filter 305 may be employed.

The parameter decoder 302 further includes a header decoder 3020, a CT information decoder 3021, and a CU decoder 3022 (prediction mode decoder), and the CU decoder 3022 further includes a TU decoder 3024. These components may be collectively referred to as a decoding module. The header decoder 3020 decodes parameter set information such as the VPS, the SPS, the PPS, and the APS and slice header (slice information) from the coded data. The CT information decoder 3021 decodes the CT from the coded data. The CU decoder 3022 decodes the CU from the coded data. In a case that the TU includes a prediction error, the TU decoder 3024 decodes QP update information (quantization correction value) and a quantization prediction error (residual coding) from the coded data. The parameter decoder 302 may derive SubWidthC and SubHeightC by decoding chroma_format_idc.

In a case other than a skip mode (skip_mode==0), the TU decoder 3024 decodes the QP update information and the quantization prediction error from the coded data. More specifically, in a case of skip_mode==0, the TU decoder 3024 decodes a flag cu_cbp that indicates whether or not the quantization prediction error is included in the target block. In a case that cu_cbp is 1, the TU decoder 3024 decodes the quantization prediction error. In a case that cu_cbp does not exist in the coded data, the TU decoder 3024 derives 0.

The TU decoder 3024 decodes an index mts_idx that indicates a transform base from the coded data.

The TU decoder 3024 decodes an index stIdx that indicates use of secondary transform and the transform base from the coded data. In a case that stIdx is 0, stIdx indicates non-application of the secondary transform. In a case that stIdx is 1, stIdx indicates transform of one of a set (pair) of secondary transform bases. In a case that stIdx is 2, stIdx indicates transform of the other of the pair.

The TU decoder 3024 may decode a subblock transform flag cu_sbt_flag. In a case that cu_sbt_flag is 1, the CU is split into multiple subblocks, and residuals of one specific subblock are decoded. Further, the TU decoder 3024 may decode cu_sbt_quad_flag that is a flag indicating whether the number of subblocks is four or two, cu_sbt_horizontal_flag that indicates a split direction, and cu_sbt_pos_flag that indicates a subblock including a transform coefficient having a value other than 0.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

The following description illustrates an example in which processing is performed in each CTU or CU. However, this example is not restrictive, and processing may be performed in each sub-CU. Alternatively, the CTU and the CU may be interpreted as a block and the sub-CU as a subblock, such that processing may be performed in each block or subblock.

The entropy decoder 301 performs entropy decoding on the coding stream Te input from the outside and decodes individual codes (syntax elements). Examples of the entropy coding includes a scheme in which syntax elements are coded in variable length coding by using a context (probability model) that is adaptively selected according to a type of the syntax elements and a surrounding condition, and a scheme in which syntax elements are coded in variable length coding by using a table or a calculation expression that is determined in advance. In Context Adaptive Binary Arithmetic Coding (CABAC) of the former case, a CABAC state of a context (probability state index pStateIdx that specifies a type (0 or 1) of a dominant symbol and probability) is stored in memory. The entropy decoder 301 initializes all the CABAC states at the start of a segment (tile, CTU row, slice). The entropy decoder 301 transforms the syntax elements into a binary string (Bin String), and decodes each bit of the Bin String. In a case of using a context, a context index ctxInc is derived for each bit of the syntax elements, each bit is decoded by using the context, and the CABAC state of the used context is updated. Bits not using a context are decoded with equal probability (EP, bypass), and ctxInc derivation and the CABAC state are omitted. Syntax elements of the decoded codes include prediction information to generate a prediction image and prediction errors to generate a difference image and the like.

The entropy decoder 301 outputs the decoded codes to the parameter decoder 302. The decoded codes include, for example, a prediction mode predMode, merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow

Figure 6:
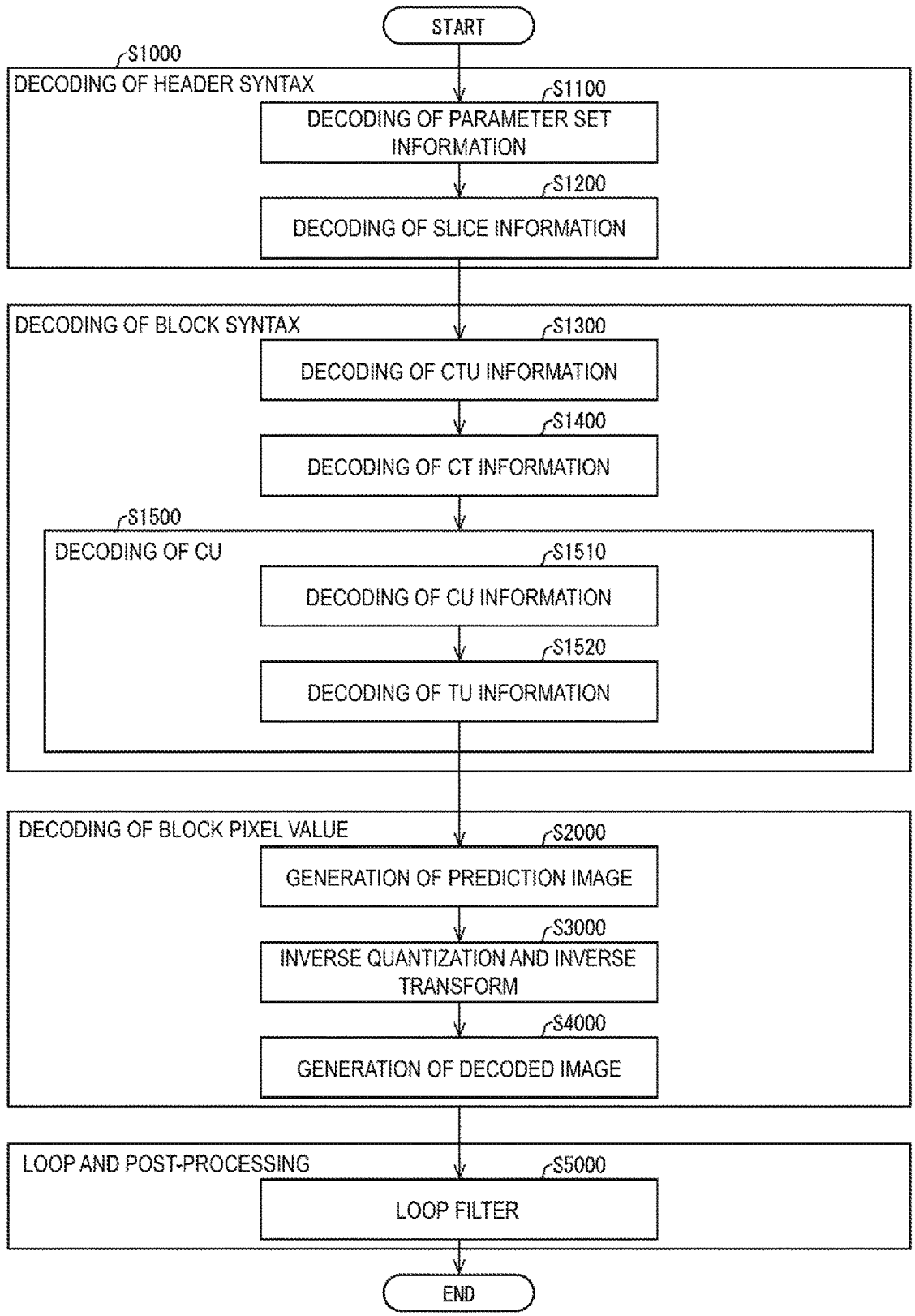
FIG. 6 is a flowchart for describing general operation performed in the video decoding apparatus.

FIG. 6 is a flowchart for describing general operation performed in the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes QP update information, a quantization prediction error, and a transform index mts_idx from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied from the prediction image generation unit 308 and the prediction error supplied from the inverse quantization and inverse transform processing unit 311.

(S5000: Loop filter) The loop filter 305 generates a decoded image by applying a loop filter such as a deblocking filter, an SAO, and an ALF to the decoded image.

Inter Prediction Image Generation Unit 309

In a case that predMode indicates an inter prediction mode, the inter prediction image generation unit 309 generates a prediction image of a block or a subblock through an inter prediction by using an inter prediction parameter input from the inter prediction parameter derivation unit 303 and a reference picture.

The inter prediction image generation unit 309 outputs the generated prediction image of the block to the addition unit 312.

Intra Prediction Image Generation Unit 310

In a case that predMode indicates an intra prediction mode, the intra prediction image generation unit 310 performs an intra prediction by using an intra prediction parameter input from the intra prediction parameter derivation unit 304 and a reference pixel read from the reference picture memory 306.

The inverse quantization and inverse transform processing unit 311 performs inverse quantization on a quantization transform coefficient input from the parameter decoder 302 to calculate a transform coefficient.

The addition unit 312 adds the prediction image of the block input from the prediction image generation unit 308 to the prediction errors input from the inverse quantization and inverse transform processing unit 311 for each pixel and generates a decoded image of the block.

The addition unit 312 stores the decoded image of the block in the reference picture memory 306, and outputs the decoded image of the block to the loop filter 305.

The loop filter 305 applies a deblocking filter, an SAO, or an ALF to the decoded image generated by the addition unit 106. FIG. 8(c) is a block diagram of the loop filter. The video decoding apparatus 31 includes the loop filter 305 (a deblocking filter 3051, an SAO unit 3052, or an ALF unit 3053), and the video coding apparatus 11 includes the loop filter 107 (a deblocking filter 1071, an SAO unit 1072, or an ALF unit 1073). Note that the SAO may not be applied, and another filter may be applied instead of the SAO.

In a case that input images adjacent to each other across a prediction boundary or a transform boundary (for example, a boundary of CUs, PUs, or TUs) are smaller than a threshold determined in advance, the deblocking filter (3051 or 1071) applies a low-pass filter to the boundary so as to smooth pixels around the boundary. The pixels on which the deblocking filter is applied are output to the SAO unit (3052 or 1072). Note that an input image Rec is an output of the addition unit 312, or an output of luma mapping with chroma scaling (LMCS) in a case that LMCS is performed. The LMCS is processing of scaling a luminance pixel value by using a histogram of decoded luminance.

The Sample Adaptive Offset (SAO) unit (3052 or 1072) categorizes pixels for the input image and adds an offset that is decoded according to the categorization, for each prescribed unit. Parameters of the offset, such as a categorization method and a value of the offset, are input from the parameter decoder 302 in the video decoding apparatus 31, and are input from a coding parameter determination unit 110 in the video coding apparatus 11. The pixels on which the SAO processing has been applied are output to the ALF unit (3053 or 1073). Note that an input image Rec3 is an image to which a deblocking filter is applied in a case that the deblocking filter is "on", and is an image before a deblocking filter is applied in a case that the deblocking filter is "off".

The ALF unit (3053 or 1073) applies an Adaptive Loop Filter (ALF) to the input image for each prescribed unit (block). Pixels AlfPic to which the ALF is applied are output to the outside and are also stored in the reference picture memory (306 or 109). Note that an input image Rec2 is an image to which an SAO is applied in a case that the SAO is "on", and is an image to which an SAO is not applied in a case that the SAO is "off". As the target block, the CTU, the CU, a fixed size (for example, 64*64 pixels or 32*32 pixels), or the like may be used. The following will describe a case that the CTU is used as the target block. However, similar description also applies to a target block other than the CTU. FIG. 10 illustrates examples of shapes of filters. FIG. 10(a) is a 7*7 filter in a diamond shape, FIG. 10(b) is a 5*5 filter in a diamond shape, FIG. 10(c) is a 3*3 filter in a diamond shape, and FIG. 10(d) is a 1*1 filter. These filter coefficients may have point symmetric values with respect to the center of each filter. The number NTAP of taps (number of reference pixels used in a filter of a target picture) of the filters in a diamond shape is 25, 13, 5, and 1, in a case of 7×7, 5×5, 3×3, and 1×1, respectively. In a case that symmetry is used, the number NumAlfFilterCoeff of filter coefficients can be reduced to 13, 7, 3, and 1, respectively.

FIG. 8(a) is a block diagram illustrating a configuration of the ALF unit 3053 of the video decoding apparatus 31. The ALF unit 3053 includes a filter set derivation unit 30531 and a filter processing unit 30532. The filter processing unit 30532 includes a characteristics derivation unit 30533, a selection unit 30534, and a filter unit 30535.

Filter Set Derivation Unit

The filter set derivation unit 30531 derives a set (filter set) of filter coefficients used in a target picture or a target slice. The filter set is signaled by using the adaptive parameter set (APS). As many as NumApsAlf filters can be signaled by using one APS. In the filter set derivation unit 30531, the filter set is derived from syntax elements of the APS decoded in the parameter decoder 302. Such filter sets are filters that can be used in a target picture or a target slice. In the following description, a filter set for luminance is represented by AlfCoeffL[apsId][filtIdx][j], and a filter set for chrominance is represented by AlfCoeffC[apsCId][j]. apsId is an ID for specifying an APS used to signal the filters (for example, apsId=0 . . . 31). filtIdx is a filter index for specifying one of the NumApsAlf filters signaled by using a certain APS (fltIdx=0 . . . NumApsALf−1). j represents a position of a coefficient included in one filter (j=0 . . . NumAlfFilterCoeff−1). Only one filter for chrominance is signaled by using one APS, and thus the filter for chrominance does not require filtIdx. apsCId is an ID for specifying an APS used to signal the filter for chrominance.

Note that information related to a clipping value necessary for derivation of the filter is also signaled by using the APS. In the filter set derivation unit 30531, a clipping value is derived from syntax elements of the APS decoded in the parameter decoder 302. A clipping value for luminance is represented by AlfClipL[apsId][filtIdx][j], and a clipping value for chrominance is represented by AlfClipC[apsCId][j].

The filter set derivation unit 30531 outputs AlfCoeffL[ ][ ][ ], AlfCoeffC[ ][ ], AlfClipL[ ][ ][ ], and AlfClipC[ ][ ] to the selection unit 30534.

Characteristics Derivation Unit

The characteristics derivation unit 30533 splits the CTU into multiple subblocks, and assigns a class to each of the subblocks. Using the class, a filter index filtIdx for selecting one filter to be used in the filter processing unit 30532 is derived from the filter set described above. Further, an index transposeIdx necessary for transposition of filter coefficients is derived. The following will describe a case that 4×4 is used as the size of the subblock. However, similar description also applies to a case that a size other than 4×4 is used.

An input image to the ALF unit 3053 is represented by rP[ ][ ], upper left coordinates of a target block are represented by (xCtb, yCtb), a pixel position in the target block is represented by (x, y), and the size of the target block is represented by wCtb and hCtb. In this case, the characteristics derivation unit 30533 derives absolute difference values filtH, filtV, filtD0, and filtD1 of pixels in the horizontal, vertical, and diagonal directions according to the following expressions. In the following description, indexes of array [x][y] may be abbreviated to [x, y].

filtH[x][y]=abs((rP[xCtb+x, yCtb+y]<<1)−rP[xCtb+x−1, yCtb+y]−rP[xCtb+x+1, yCtb+y])
filtV[x][y]=abs((rP[xCtb+x, yCtb+y]<<1)−rP[xCtb+x, yCtb+y−1]−rP[xCtb+x, yCtb+y+1])
filtD0[x][y]=abs((rP[xCtb+x, yCtb+y]<<1)−rP[xCtb+x−1, yCtb+y−1]−rP[xCtb+x+1, yCtb+y+1])
filtD1[x][y]=abs((rP[xCtb+x, yCtb+y]<<1)−rP[xCtb+x+1, yCtb+y−1]−rP[xCtb+x−1, yCtb+y+1])

In x=0 . . . (wCtb−1)>>2, y=0 . . . (hCtb−1)>>2, the characteristics derivation unit 30533 derives sums sumH, sumV, sumD0, and sumD1 of the absolute difference values of each subblock and an activity sumOfHV according to the following expressions. Σ is a sum of i, j=−2 . . . 5.
sumH[x][y]=ΣΣfiltH[(x<<2)+i][(y<<2)+j]
sumV[x][y]=ΣΣfiltV[(x<<2)+i][(y<<2)+j]
sumD0[x][y]=ΣΣfiltD0[h(x<<2)+i][v(y<<2)+j]
sumD1[x] [y]=ΣΣfiltD1[h (x<<2)+i] [v(y<<2)+j]
sumOfHV[x][y]=sumH[x][y]+sumV[x][y]
The characteristics derivation unit 30533 derives variables hv0, hv1, and dirHV by using the sums sumH and sumV of the difference values of each subblock. In a case that sumV[x>>2][y>>2] is larger than sumH[x>>2][y>>2], the following expressions are used for derivation.
hv1=sumV[x>>2][y>>2]
hv0=sumH[x>>2][y>>2]
dirHV=1

Otherwise, the following expressions are used for derivation.
hv1=sumH[x>>2][y>>2]
hv0=sumV[x>>2][y>>2]
dirHV=3

The characteristics derivation unit 30533 derives variables d0, d1, and dirD by using the sums sumD0 and sumD1 of the difference values of each subblock. In a case that sumD0[x>>2][y>>2] is larger than sumD1[x>>2][y>>2], the following expressions are used for derivation.
d1=sumD0[x>>2][y>>2]
d0=sumD1[x>>2][y>>2]
dirD=0

Otherwise, the following expressions are used for derivation.
d1=sumD1[x>>2][y>>2]
d0=sumD0[x>>2][y>>2]
dirD=2

The characteristics derivation unit 30533 derives variables hvd1 and hvd0 by using hv0, hv1, dirHV, d0, d1, and dirD.
hvd1=(d1*hv0>hv1*d0)?d1:hv1
hvd0=(d1*hv0>hv1*d0)?d0:hv0

The characteristics derivation unit 30533 derives direction variables dirS[x][y], dir1[x][y], and dir2[x][y] according to the following expressions.
dir1[x][y]=(d1*hv0>hv1*d0)?dirD:dirHV
dir2[x][y]=(d1*hv0>hv1*d0)?dirHV:dirD
dirS[x][y]=(hvd1>2*hvd0)?1:((hvd1*2>9*hvd0)?2:0)
The characteristics derivation unit 30533 derives a class avgVar[x][y], according to the activity sumOfHV.
avgVar[x][y]=varTab[Clip3(0, 15, (sumOfHV[x>>2][y>>2]*ac)>>(3+BitDepthY))]
varTab[ ]={0, 1, 2, 2, 2, 2, 2, 3, 3, 3, 3, 3, 3, 3, 3, 4}
Here, BitDepthY is a bit depth of luminance, and ac is a prescribed constant and is, for example, 64 or 96.

The characteristics derivation unit 30533 derives filtIdx[x][y] and transposeIdx[x][y] by using avgVar, dir2, and dirS.
transposeIdx[x][y]=transposeTable[dir [x][y] *2+(dir2[x][y]>>1)]
transposeTable[ ]={0, 1, 0, 2, 2, 3, 1, 3}
filtIdx[x][y]=avgVar[x][y]
Note that, in a case that dirS[x][y] is not 0, filtIdx[x][y] may be changed as follows.
filtIdx[x][y]+=(((dir1[x][y] & 0x1)<<1)+dirS[x][y])*5
According to the above expression, the same value is stored in filtIdx[ ][ ] and transposeIdx[ ][ ] for each subblock.

The characteristics derivation unit 30533 outputs filtIdx[ ][ ] and transposeIdx[ ][ ] to the selection unit 30534.
Selection Unit The selection unit 30534 derives a filter coefficient f[ ] and a clipping value c[ ] by using AlfCoeffL[ ][ ][ ], AlfCoeffC[ ][ ], AlfClipL[ ][ ][ ], and AlfClipC[ ][ ] being output of the filter set derivation unit 30531, transposeIdx[ ][ ] and filtIdx[ ][ ] being output of the characteristics derivation unit 30533, and apsId and apsCId being output of the parameter decoder.

The filter f[ ] and the clipping value c[ ] for luminance are derived according to the following expressions.
f[j]=AlfCoeffL[apsId][filtIdx[x][y]][j]
c[j]=AlfClipL[apsId][filtIdx[x][y]][j]
Note that, in a case of luminance, the order of filter coefficients is changed according to transposeIdx[ ][ ]. Thus, the filter coefficient and the clipping value applied in the filter unit 30535 are f[idx[j]] and c[idx[j]].

For example, in a case that transpose[x][y] is 1, idx[ ]={9, 4, 10, 8, 1, 5, 11, 7, 3, 0, 2, 6} is used. In a case that transposeIndex[x][y] is 2, idx[ ]={0, 3, 2, 1, 8, 7, 6, 5, 4, 9, 10, 11} is used. In a case that transposeIndex[x][y] is 3, idx[ ]={9, 8, 10, 4, 3, 7, 11, 5, 1, 0, 2, 6} is used. In other cases, idx[ ]={0, 1, 2, 3, 4, 5, 6, 7, 8, 9, 10, 11} is used. In reference to the filters of FIG. 10, for example, in a case that transpose[x][y]=0, {a0, a1, a2, a3, a4, a5, a6, a7, a8, a9, a10, a11} is {f[0], f[1], f[2], f[3], f[4], f[5], f[6], f[7], f[8], f[9], f[10], f[11]}. In a case that transpose[x][y]=1, {a0, a1, a2, a3, a4, a5, a6, a7, a8, a9, a10, a11} is {f[9], f[4], f[10], f[8], f[1], f[5], f[11], f[7], f[3], f[0], f[2], f[6]}. Note that a12 is derived by using a0 to a11.

a12=128−2*Σam

Σ represents a sum of m=0 . . . 11. In other words, a12 is a value obtained by subtracting a double of the sum of a0 to a11 from 128.

The filter f[ ] and the clipping value c[ ] for chrominance are derived according to the following expressions.

f[j]=AlfCoeffC[apsCId][j]
c[j]=AlfClipC[apsCId][j]

The selection unit 30534 outputs f[ ], c[ ], and idx[ ] to the filter unit 30535.

Filter Unit

The filter unit 30535 applies the ALF to the input image rP[ ] by using f[ ], c[ ], and idx[ ] being output of the selection unit 30534.

In a case of luminance, an input image is represented by rPL[x, y], a target pixel is represented by curr, and an output image is represented by AlfPicL[x][y]. In this case, the ALF can be expressed as in the following expressions. Note that, as for the filter, 7*7 is used.

curr=rPL[x,y]  (Expression ALF-1)

sum=f[idx[0]] *(Clip3(−c[idx[0]], c[idx[0]], rPL[x, y+3]−curr)+
Clip3(−c[idx[0]], c[idx[0]], rPL[x, y−3]−curr))+f[idx[1]] *(Clip3(−c[idx[1]], c[idx[1]], rPL[x+1, y+2]−curr)+
Clip3(−c[idx[1]], c[idx[1]], rPL[x−1, y−2]−curr))+f[idx[2]] *(Clip3(−c[idx[2]], c[idx[2]], rPL[x, y+2]−curr)+
Clip3(−c[idx[2]], c[idx[2]], rPL[x, y−2]−curr))+f[idx[3]] *(Clip3(−c[idx[3]], c[idx[3]], rPL[x− 1, y+2]−curr)+
Clip3(−c[idx[3]], c[idx[3]], rPL[x+1, y− 2]− curr))+f[idx[4]] *(Clip3(−c[idx[4]], c[idx[4]], rPL[x+2, y+1]−curr)+
Clip3(−c[idx[4]], c[idx[4]], rPL[x− 2, y− 1]− curr))+f[idx[5]] *(Clip3(−c[idx[5]], c[idx[5]], rPL[x+1, y+1]−curr)+
Clip3(−c[idx[5]], c[idx[5]], rPL[x− 1, y− 1]− curr))+f[idx[6]] *(Clip3(−c[idx[6]], c[idx[6]], rPL[x, y+1]− curr)+
Clip3(−c[idx[6]], c[idx[6]], rPL[x, y− 1]− curr))+f[idx[7]] *(Clip3(−c[idx[7]], c[idx[7]], rPL[x− 1, y+1]−curr)+
Clip3(−c[idx[7]], c[idx[7]], rPL[x+1, y− 1]− curr))+f[idx[8]] *(Clip3(−c[idx[8]], c[idx[8]], rPL[x− 2, y+1]−curr)+
Clip3(−c[idx[8]], c[idx[8]], rPL[x+2, y− 1]− curr))+f[idx[9]] *(Clip3(−c[idx[9]], c[idx[9]], rPL[x+3, y]− curr)+
Clip3(−c[idx[9]], c[idx[9]], rPL[x− 3, y]− curr))+f[idx[10]] *(Clip3(−c[idx[10]], c[idx[10]], rPL[x+2, y]−curr)+
Clip3(−c[idx[10]], c[idx[10]], rPL[x− 2, y]− curr))+f[idx[11]] *(Clip3(−c[idx[11]], c[idx[11]], rPL[x+1, y]−curr)+
Clip3(−c[idx[11]], c[idx[11]], rPL[x− 1, y]− curr))
sum=curr+((sum+64)>>7)
AlfPicL[xCtb+x][yCtb+y]=Clip3(0, (1<<BitDepthY)− 1, sum)

BitDepthY is a bit depth of a luminance pixel. Here, 64 and 7 are a constant and a shift value of round shift processing, respectively, and may be different values.

In a case of chrominance, an input image is represented by rPC[x, y], a target pixel is represented by curr, and an output image is represented by AlfPicC[x][y]. In this case, the ALF can be expressed as in the following expressions. Note that, as for the filter, 5*5 is used.

curr=rPC[x,y]  (Expression ALF-2)

sum=f[0] *(Clip3(−c[0], c[0], rPC[x, y+2]− curr)+
Clip3(−c[0], c[0], rPC[x, y− 2]− curr))+
f[1] *(Clip3(−c[1], c[1], rPC[x+1, y+1]− curr)+
Clip3(−c[1], c[1], rPC[x− 1, y− 1]− curr))+
f[2] *(Clip3(−c[2], c[2], rPC[x, y+1]− curr)+
Clip3(−c[2], c[2], rPC[x, y− 1]− curr))+
f[3] *(Clip3(−c[3], c[3], rPC[x− 1, y+1]− curr)+
Clip3(−c[3], c[3], rPC[x+1, y− 1]− curr))+
f[4] *(Clip3(−c[4], c[4], rPC[x+2, y]− curr)+
Clip3(−c[4], c[4], rPC[x− 2, y]− curr))+
f[5] *(Clip3(−c[5], c[5], rPC[x+1, y]− curr)+
Clip3(−c[5], c[5], rPC[x− 1, y]− curr))
sum=curr+(sum+64)>>7
AlfPicC[xCtbC+x][yCtbC+y]=Clip3(0, (1<<BitDepthC)− 1, sum)

BitDepthC is a bit depth of a chrominance pixel.

The filter unit 30535 outputs AlfPicL[ ][ ] and AlfPicC[ ][ ] to the outside (display apparatus) and the reference picture memory 306. AlfPicC[ ][ ] is either AlfPicCb[ ][ ] or AlfPicCr[ ][ ].

Figure 8:
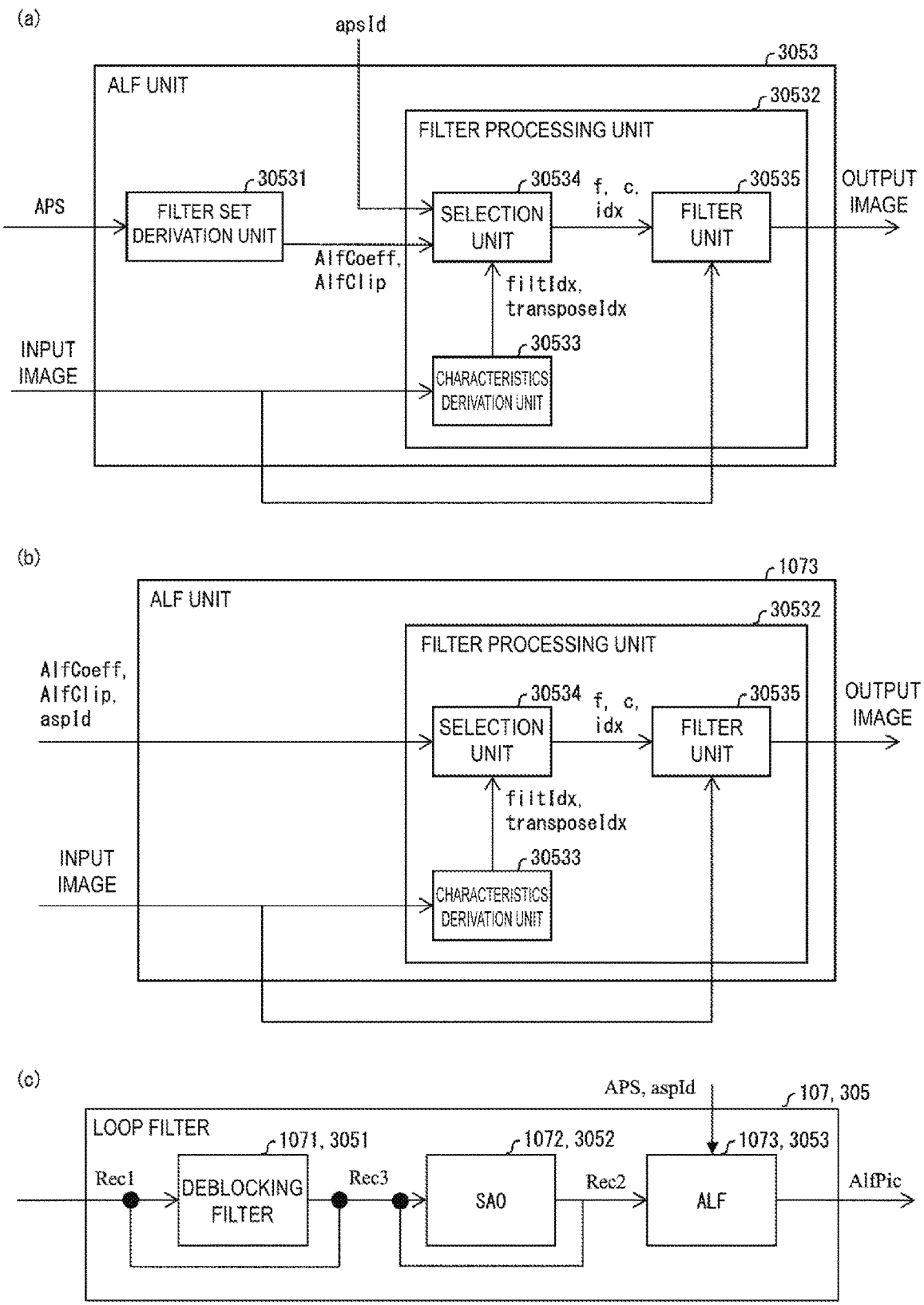
FIG. 8 is a block diagram illustrating configurations of a loop filter according to the present disclosure.
Figure 9:
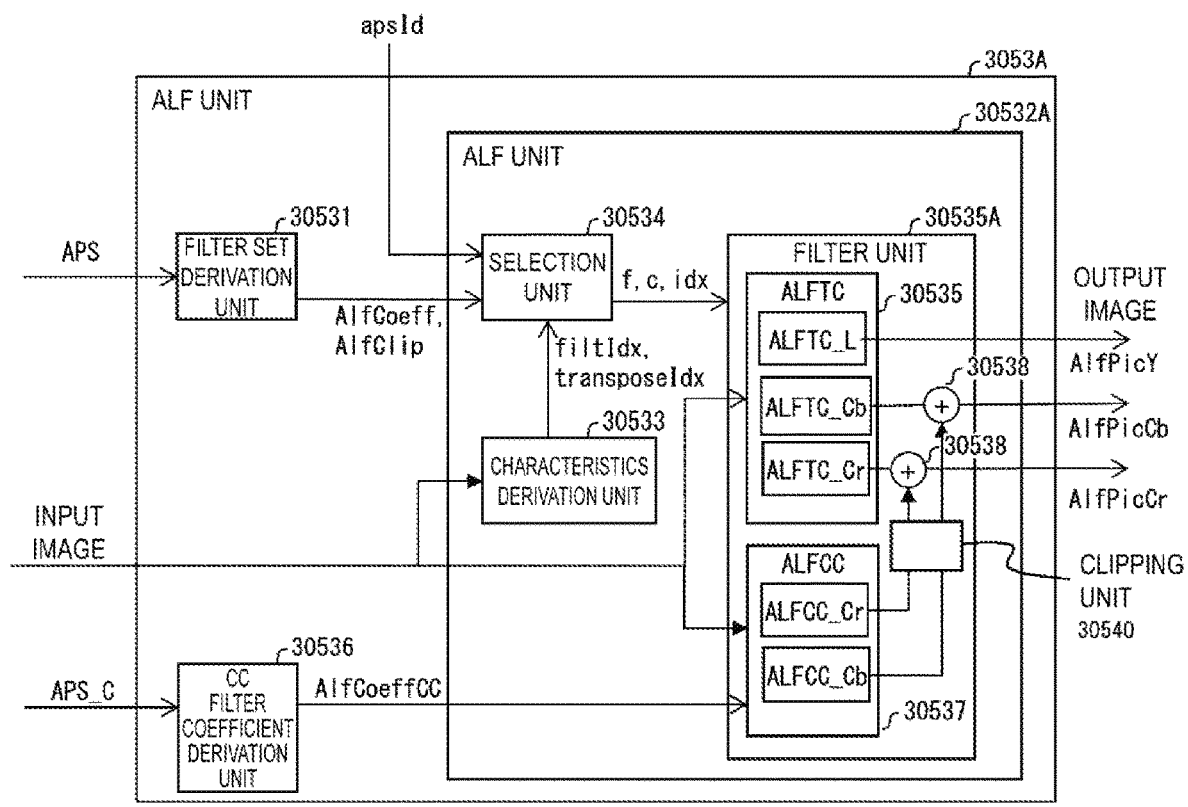
FIG. 9 is a block diagram illustrating a configuration of a loop filter according to the present disclosure.

FIG. 9 is a block diagram for describing an ALF unit 3053A, which is another embodiment of the ALF unit. In the ALF unit 3053 of FIG. 8, the filters for chrominance have fewer options and have fewer pixels to be referred, in comparison with the filters for luminance. In the present embodiment, image quality of a chrominance image is enhanced by increasing information of the filters for chrominance to be signaled and referring to a luminance image in addition to the chrominance image.

In FIG. 9, a CC filter coefficient derivation unit 30536, an ALFCC 30537, an addition unit 30538, and a clipping unit 30540 are added to the configuration of FIG. 8(*a*). The ALFTC 30535 is the same as the filter unit 30535 of FIG. 8(*a*). The ALF unit 3053A derives a filter coefficient of a cross component (CC filter coefficient) AlfCoeffCC in the CC filter coefficient derivation unit 30356. The ALFCC 30537 derives a value (for example, a value to be added to a chrominance image) to be used for a filter of a target color component image (for example, the chrominance image) by referring to the CC filter coefficient and another color component image (for example, a luminance image) of an input image, clips the derived value in the clipping unit 30540, and adds the clipped value to output of the ALFTC in the addition unit 30538. The input image to the ALFCC and the input image to the ALFTC are the same, which are also the input image to the loop filter 305. In other words, in a case that the loop filter includes multiple stages, the ALFTC and the ALFCC use an image of the same stage (for example, an image to which the SAO is applied).

Cross Component Filter

FIG. 11 illustrates an example of the APS that is used to signal syntax of the CC filter to be used in the ALF unit 3053A. In addition to syntax to be used in the ALF unit 3053, alf_cross_component_coeff_abs[ ] and alf_cross_component_coeff_sign[ ] are added. These syntax elements are decoded in the parameter decoder 302, and are input to the CC filter coefficient derivation unit 30536. Note that FIG. 11 is an example in which the filter shape is 3*3 as illustrated in FIG. 10(*c*).

CC Filter Coefficient Derivation Unit

The CC filter coefficient derivation unit 30536 derives a CC filter coefficient AlfCoeffCC[ ] from the syntax elements described above.

AlfCoeffCC[apsCId][j]=alf_cross_component_coeff_abs[j] *(1−2*alf_cross_component_coeff_sign[j])

fcc[j]=AlfCoeffCC[apsCId][j]

The CC filter coefficient derivation unit 30536 outputs fcc[ ] to the ALFCC 30537.

ALFCC

The ALFCC 30537 performs filter processing by using an input image rPL[ ] being an image of a color component different from a target color component, by using fcc[ ] being output of the CC filter coefficient derivation unit 30536. Here, the input image rP of the ALF unit 3053 is represented by (rPL, rPC). The input image of a color component (for example, luminance) different from the target color component is represented by rPL[x, y], and its output image is represented by addCC[x][y]. In this case, the ALFCC 30537 performs processing according to the following expressions.

$$sumCC = \Sigma fcc[k] * rPL[xx+i, yy+j] \quad \text{(Expression ALF-3)}$$

addCC[x][y]=(sumCC+(1<<(shiftCC−1)))>>shiftCC

Here, Σ represents a sum related to k, (i, j) represents a position of a reference luminance image corresponding to a filter coefficient fcc[k] of k and is, for example, a set of values within ranges of i=−3 . . . 3 and j=−3 . . . 3. In the following description, k is used as an index for fcc. shiftCC is bit accuracy of a filter coefficient fcc[ ], and 1<<(shiftCC−1) is an offset for round. (xx, yy) is a position of a luminance image rPL corresponding to a target chrominance pixel, and may be (xx, yy)=(x, y) or may be changed according to SubWidthC and SubHeightC. xx=x*SubWidthC, yy=y*SubHeightC. The above expressions can also be expressed as follows through substitution of the values.

$$sumCC = \Sigma fcc[k] * rPL[x*SubWidthC+i, y*SubHeightC+j] \quad \text{(Expression ALF-4)}$$

addCC[x][y]=(sumCC+(1<<(shiftCC−1)))>>shiftCC

For example, a value range of addCC is 8+10+ceil(log 2(14))−8=14 bits, in a case that, for example, accuracy shiftCC of fcc is 8, bitDepth of rPL is 10, and the number of reference pixels (k) is 14. shiftCC may be 7, 8, 9, or 10, for example. The following will describe an example in which shiftCC=7, 8. The following expressions may be used in a case that filter coefficients of the filter shape illustrated in FIG. 12(*a*) are used.

$$sumCC = fcc[0]*(rPL[xx,yy−2]+rPL[xx,yy+3])+fcc[1] \\
*rPL[xx−1,yy−1]+fcc[2]*rPL[xx,yy−1]+fcc[3] \\
*rPL[xx+1,yy−1]+fcc[4]*(rPL[xx−2,yy]+rPL[xx+ \\
2,yy]+rPL[xx−2,yy+1]+rPL[xx+2,yy+1])+fcc[5] \\
*rPL[xx−1,yy]+fcc[6]*rPL[xx,yy]+fcc[7]*rPL \\
[xx+1,yy]+fcc[8]*rPL[xx−1,yy+1]+fcc[9]*rPL \\
[xx,yy+1]+fcc[10]*rPL[xx+1,yy+1]+fcc[11]*rPL \\
[xx−1,yy+2]+fcc[12]*rPL[xx,yy+2]+fcc[13]*rPL \\
[xx+1,yy+2] \quad \text{(Expression ALF-5)}$$

addCC[x][y]=(sumCC+128)>>8

Figure 12:
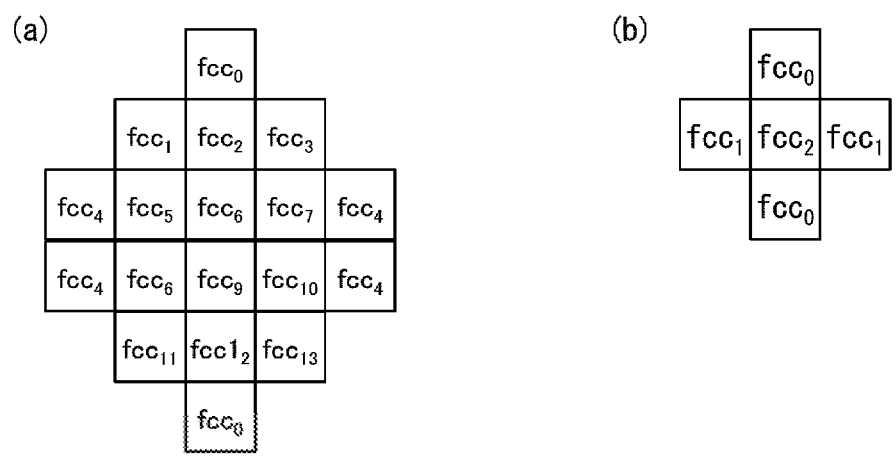
FIG. 12 is a diagram illustrating shapes of loop filters according to the present disclosure.

Alternatively, the following expressions may be used in a case that filter coefficients of the filter shape illustrated in FIG. 12(*b*) are used.

$$sumCC = fcc[0]*(rPL[xx,yy+1]+rPL[xx,yy−1])+fcc[1]* \\
(rPL[xx+1,yy]+rPL[xx−1,yy])+fcc[2]*rPL[xx,yy] \quad \text{(Expression ALF-6)}$$

addCC[x][y]=(sumCC+64)>>7

The ALFCC 30537 outputs addCC[ ][ ] to the addition unit 30358.

Alternatively, derivation may be performed using other coefficients without signaling one fcc[n−1] out of the filter coefficients, in such a manner that the total of the filter coefficients equals to (1<<shiftCC).

fcc[n−1]=(1<<shiftCC)−Σfcc[k]

Here, Σ is a sum of k=0 . . . n−2, and n is the number of filter coefficients.

A luminance pixel rPL at a position corresponding to a chrominance pixel may be a pixel that is derived by filtering or subsampling the luminance pixel rPL. One example of such subsampling is as follows.

rPL[x,y]=rPL[x*SubWidthC,y*SubHeightC]

Addition Unit and Clipping Unit

The addition unit 30358 adds a filter image AlfPicC[ ][ ](=AlfPicCb[ ][ ], AlfPicCr[ ][ ]) of the target color component being output of the ALFTC 30535 and a filter image addCC[ ][ ] of the cross component being output of the ALFCC 30357. The clipping unit 30540 limits addCC[x][y] to a prescribed value range before the addition of AlfPicC[x][y] and addCC[x][y]. For example, the clipping unit 30540 clips addCC[x][y] to a prescribed value range that is represented by minCC and maxCC.

AlfPicCb[x][y]=AlfPicCb[x][y]+Clip3(minCC, maxCC, addCCb[x][y])

AlfPicCr[x][y]=AlfPicCr[x][y]+Clip3(minCC, maxCC, addCCr[x][y])

Note that AlfPicCb and AlfPicCr on the right-hand side are filter images derived according to (Expression ALF-2). addCCb and addCCr are difference values derived according to (Expression ALF-5). Further, shift processing may be performed after the addition processing.

AlfPicCb[x][y]=(AlfPicCb[x][y]+Clip3(minCC, maxCC, addCCb[x][y])+(1−(shiftCC2−1)))>>shiftCC2

AlfPicCr[x][y]=(AlfPicCr[x][y]+Clip3(minCC, maxCC, addCCr[x][y])+(1−(shiftCC2−1)))>>shiftCC2

In other words, the filter unit 30535 as a whole performs filter processing by adding a clip value of a term obtained through multiply-accumulate operation and round shift processing performed on the chrominance image and a clip value of a term obtained through multiply-accumulate operation and round shift processing performed on the luminance image. Therefore, AlfPicCb[ ][ ] and AlfPicCr[ ][ ] can also be expressed as follows:

AlfPicCb[x][y]=(rPCb[x][y]+Σf[ij] *(Clip3 (−c[ij], c[ij], rPCb[x+i][y+j]−rPCb[x][y])+64)>>7+Clip3(minCC, maxCC, addCCb[x][y])

AlfPicCr[x][y]=(rPCr[x][y]+Σf[ij] *(Clip3 (−c[ij], c[ij], rPCr[x+i][y+j]−rPCr[x][y])+64)>>7+Clip3(minCC, maxCC, addCCr[x][y])

Here, rPCb[ ][ ] and rPCr[ ][ ] are each a chrominance input image of the filter unit 30535. Σ represents a sum with respect to positions (i, j) in a filter shape of the filter unit 30535, and f[ij] and c[ij] are a coefficient value and a clip value corresponding to the position (i, j), respectively.

With the use of a value rangeCCBit representing a bit width, for example, minCC and maxCC may be configured to be the following values:

minCC=−(1<<rangeCCBit)

maxCC=(1<<rangeCCBit)−1 rangeCCBit may be a fixed value (for example, rangeCCBit=5, 6, 7, 8, or the like). For example, in a case that rangeCCBit=6, values are limited as follows.

AlfPicCb[x][y]=AlfPicCb[x][y]+Clip3(−64, 63, addCCb[x][y])

AlfPicCr[x][y]=AlfPicCr[x][y]+Clip3(−64, 63, addCCr[x][y])

According to the above, in a configuration of storing addCC [ ][ ] being a component of ccALF derived from the luminance image in a memory in advance and using addCC stored in the memory, the amount of memory necessary for such storage can be reduced. For example, in a case that a value range of addCC before being limited is 14 bits and rangeCCBit=6, a necessary amount of memory can be reduced to less than a half (=6/14).

It is appropriate to configure rangeCCBit so as to depend on bitDepth. For example, with the use of a difference between bitDepth and a prescribed constant Mcc (rangeCCBit=bitDepth−Mcc), the following values may be set:
minCC=−(1<<(bitDepth−3))
maxCC=(1<<(bitDepth−3))− 1
Here, Mcc may be 2, 3, 4, 5, or the like. Further, as a value (for example, an absolute value) of the clip value, a lower limit independent of a bit depth may be provided (rangeCCBit=max(minD, bitDepth−Mcc), for example, minD=6):
minCC=−max(64, (1<<(bitDepth−3)))
maxCC=max(64, (1<<(bitDepth−3)))− 1
The lower limit minD is not limited to 6. Further, an upper limit independent of a bit depth may be provided (rangeCCBit=min(maxD, bitDepth−Mcc), for example, maxD=15):
minCC=−min(32768, (1<<(bitDepth−3)))
maxCC=min(32768, (1<<(bitDepth−3)))− 1
Similarly, the upper limit maxDepth is not limited to 15 bits. Further, a lower limit and an upper limit may be provided (rangeCCBit=Clip3(minD, maxD, bitDepth−Mcc)):
minCC=−Clip3(64, 32768, (1<<(bitDepth−3)))
maxCC=Clip3(64, 32768, (1<<(bitDepth−3)))− 1
Alternatively, with the use of bitDepth/2 and a prescribed constant Mcc2, the following values may be set (rangeCCBit=bitDepth/2+Mcc2):
minCC=−(1<<(bitDepth/2+1))
maxCC=(1<<(bitDepth/2+1))−1
Here, Mcc2 may be 0, 1, 2, 3, or the like.

rangeCCBit may be switched according to an attribute and a value related to a pixel to be filtered. In this case, such switching may be performed in multiple stages by using multiple thresholds. For example, such switching may be performed as follows. Specifically, in a case that a slice type of a slice to which the pixel to be filtered belongs is an intra slice (I slice), the following values may be set by using rangeCCBit1:
minCC=−(1<<rangeCCBit1)
maxCC=(1<<rangeCCBit1)−1
In a case that the slice type is an inter slice (B or P slice), by contrast, the following values may be set by using rangeCCBit2:
minCC=−(1<<rangeCCBit2)
maxCC=(1<<rangeCCBit2)−1
In this manner, a range of a change amount can be switched according to prediction schemes having characteristics different from each other.

Further, in another method, a set of minCC and maxCC may be switched based on a QP value in the pixel to be filtered. For example, in a case that QP is less than a certain threshold QP_th, the following values may be used:
minCC=−(1<<rangeCCBit1)
maxCC=(1<<rangeCCBit1)−1
In a case that QP is larger or equal to QP_th, by contrast, the following values may be used:
minCC=−(1<<rangeCCBit2)
maxCC=(1<<rangeCCBit2)−1

In still another method, a range of a change amount may be switched according to a bit depth of the pixel to be filtered. For example, in a case that a bit depth bitDepth of the pixel to be filtered is less than 10, the following values may be used:
minCC=−(1<<rangeCCBit1)
maxCC=(1<<rangeCCBit1)−1
In a case that the bit depth bitDepth is larger or equal to 10, by contrast, the following values may be used.
minCC=−(1<<rangeCCBit2)
maxCC=(1<<rangeCCBit2)−1
With the use of a ternary operator, the above values can also be expressed as follows: minCC=−(1<<(bitDepth<10 ?rangeCCBit1:rangeCCBit2))
maxCC=(1<<(bitDepth<10 ?rangeCCBit1:rangeCCBit2))
Here, a value of (rangeCCBit1, rangeCCBit2) is, for example, (5, 6), (5, 7), (6, 7), or the like.

The addition unit 30358 outputs AlfPicCb[ ][ ] and AlfPicCr[ ][ ] to the outside (display apparatus) and the reference picture memory 306.

Configuration of Video Coding Apparatus

Figure 7:
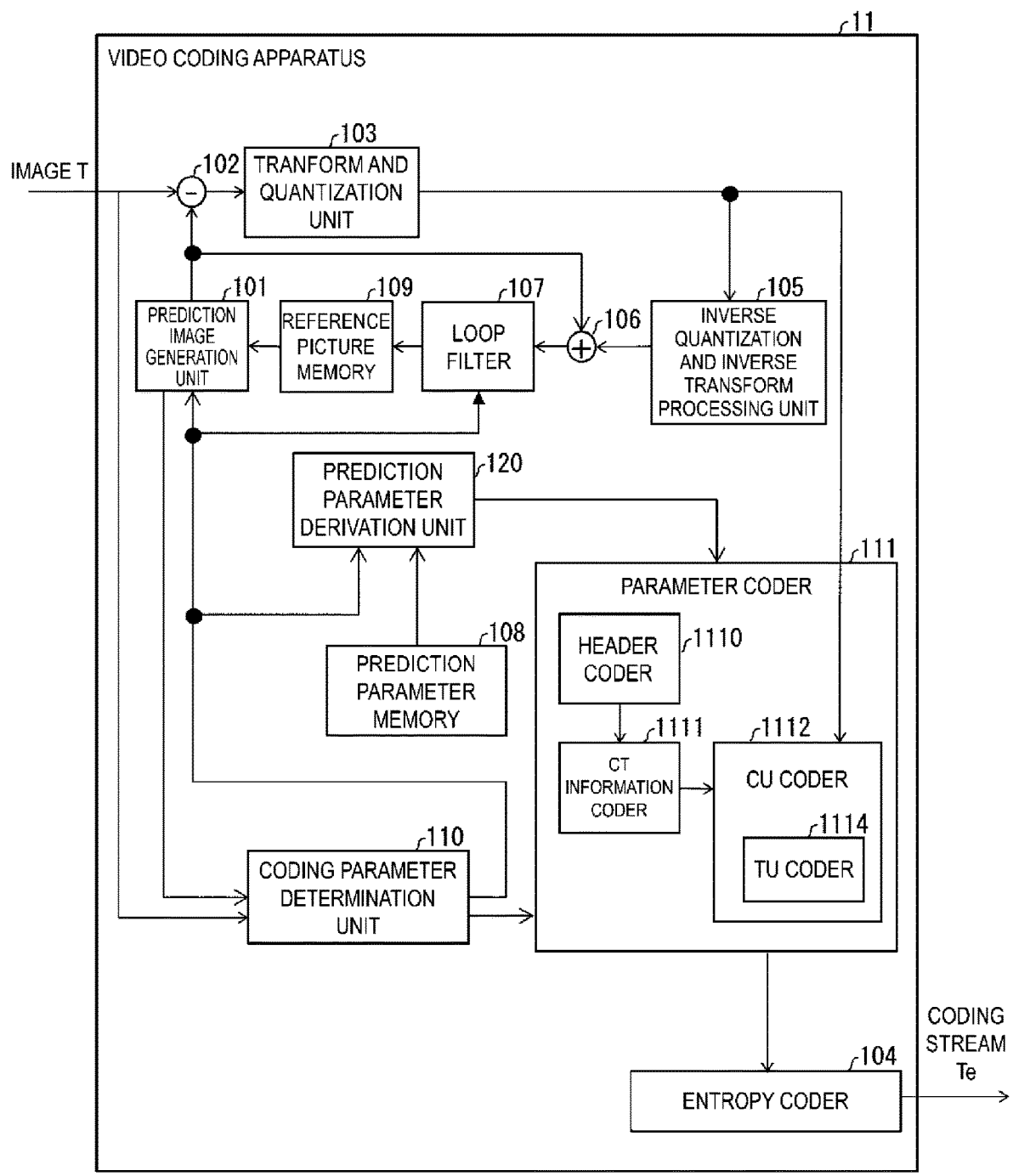
FIG. 7 is a block diagram illustrating a configuration of a video coding apparatus.

Next, a configuration of the video coding apparatus 11 according to the present embodiment will be described. FIG. 7 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and the intra prediction image generation unit 310 that are described in the above, and thus description thereof will be omitted.

The subtraction unit 102 subtracts a pixel value of the prediction image of the block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient through quantization. The transform and quantization unit 103 outputs the quantization transform coefficient to the parameter coder 111 and the inverse quantization and inverse transform processing unit 105.

The inverse quantization and inverse transform processing unit 105 is the same as the inverse quantization and inverse transform processing unit 311 (FIG. 5) of the video decoding apparatus 31, and thus description thereof will be omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114.

To the entropy coder 104, the quantization transform coefficients and the coding parameters (split information, prediction parameter) are input from the parameter coder 111. The entropy coder 104 performs entropy coding on the input quantization transform coefficients and coding parameters to generate the coding stream Te, and outputs the generated coding stream Te.

The prediction parameter derivation unit 120 is a means including an inter prediction parameter coder 112 and an intra prediction parameter coder 113, and derives an intra prediction parameter and an intra prediction parameter from the parameters input from the coding parameter determination unit 110. The derived intra prediction parameter and intra prediction parameter are output to the parameter coder 111.

The addition unit 106 adds a pixel value of the prediction block input from the prediction image generation unit 101 and a pixel value of the prediction error input from the inverse quantization and inverse transform processing unit 105 for each pixel and generates a decoded image. The addition unit 106 stores the generated decoded image in the reference picture memory 109.

The loop filter 107 applies a deblocking filter, an SAO, or an ALF to the decoded image generated by the addition unit 106.

FIG. 8(b) is a block diagram illustrating a configuration of the ALF unit 1073 of the video coding apparatus 11. The ALF unit 1073 includes the filter processing unit 30532. The filter processing unit 30532 is the filter processing unit 30532 of the ALF unit 3053 of the video decoding apparatus 31, and thus description thereof will be omitted. To the ALF unit 1073, a filter set to be used in a target picture or a target slice is input from the coding parameter determination unit 110, and thus the filter set derivation unit 30531 is unnecessary. The ALF unit 1073 uses the reference picture memory 109 to read a reference image or output an output image.

The prediction parameter memory 108 stores the prediction parameters generated by the coding parameter determination unit 110 in a position predetermined for each target picture and CU.

The reference picture memory 109 stores the decoded image generated by the loop filter 107 in a position predetermined for each target picture and CU.

The coding parameter determination unit 110 selects one set among multiple sets of coding parameters. A coding parameter refers to the above-mentioned QT, BT, or TT split information, prediction parameters, or parameters to be coded that are generated in association with these. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient A by a square error. The code amount is an amount of information of the coding stream Te obtained by performing entropy coding on a quantization error and a coding parameter. The square error is the sum of squares of prediction errors calculated in the subtraction unit 102. The coefficient A is a real number greater than a preconfigured zero. The coding parameter determination unit 110 selects a set of coding parameters of which cost value calculated is a minimum value. The coding parameter determination unit 110 outputs the determined coding parameters to the parameter coder 111 and the prediction parameter derivation unit 120.

Note that some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, the parameter coder 111, and the prediction parameter derivation unit 120, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

A part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present disclosure has been described in detail above referring to the drawings, but the specific configuration is not limited to the above embodiments and various amendments can be made to a design that fall within the scope that does not depart from the gist of the present disclosure.

Application Examples

The above-mentioned video coding apparatus 11 and the video decoding apparatus 31 can be utilized being installed to various apparatuses performing transmission, reception, recording, and regeneration of videos. Note that the video may be a natural video imaged by a camera or the like, or may be an artificial video (including CG and GUI) generated by a computer or the like.

Figure 2:
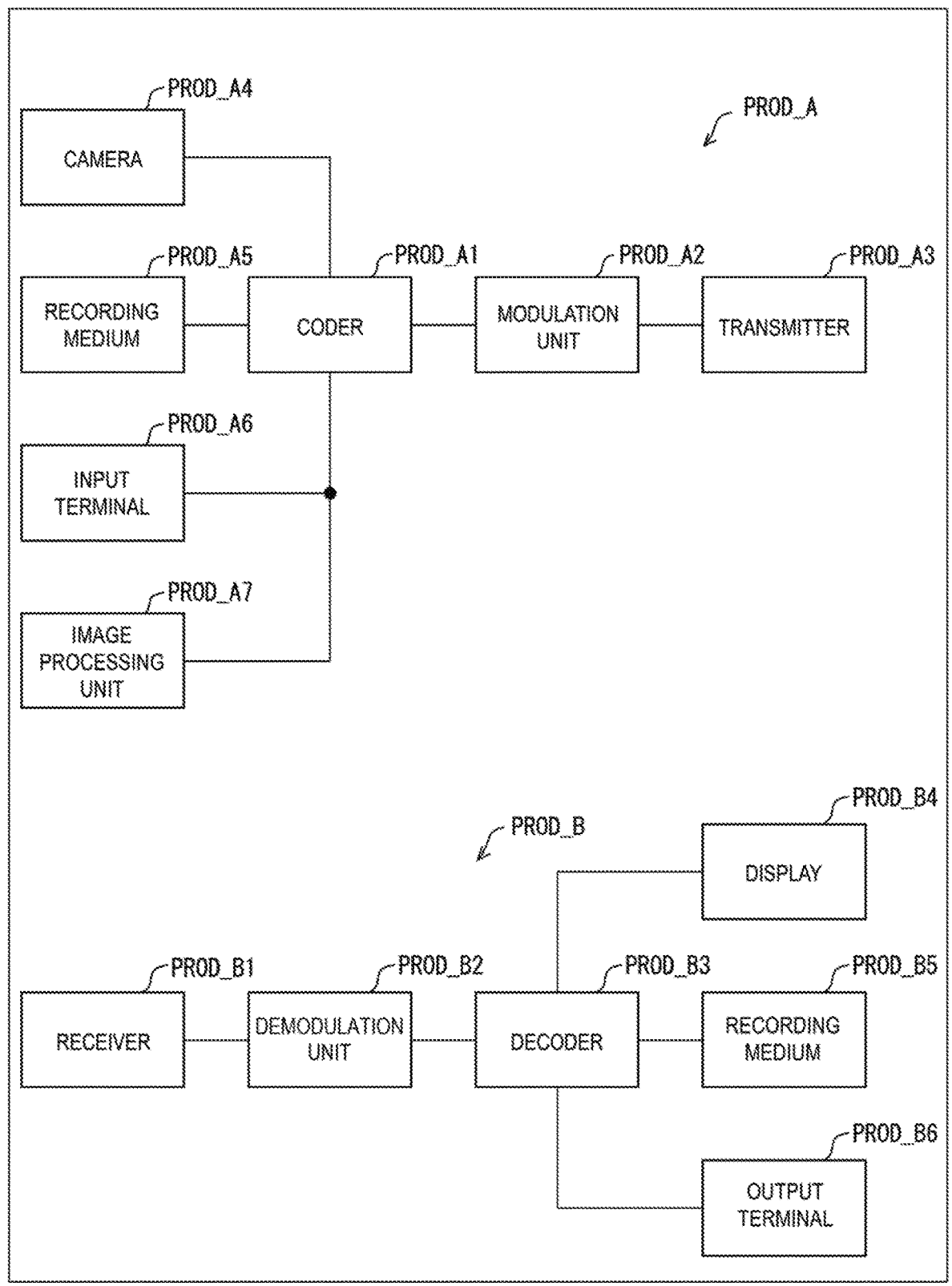
FIG. 2 is a diagram illustrating configurations of a transmitting apparatus equipped with a video coding apparatus and a receiving apparatus equipped with the video decoding apparatus according to the present embodiment. (a) thereof illustrates the transmitting apparatus equipped with the video coding apparatus, and (b) thereof illustrates the receiving apparatus equipped with the video decoding apparatus.

At first, referring to FIG. 2, it will be described that the above-mentioned video coding apparatus 11 and the video decoding apparatus 31 can be utilized for transmission and reception of videos.

FIG. 2(a) is a block diagram illustrating a configuration of a transmitting apparatus PROD_A installed with the video coding apparatus 11. As illustrated in FIG. 2(a), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit PROD_A7 which generates or processes images, as supply sources of videos to be input into the coder PROD_A1. Although an example configuration in which the transmitting apparatus PROD_A includes all of the constituents is illustrated in FIG. 2(a), some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(b) is a block diagram illustrating a configuration of a receiving apparatus PROD_B installed with the video decoding apparatus 31. As illustrated in FIG. 2(b), the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 2(b), some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

Note that a client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Figure 3:
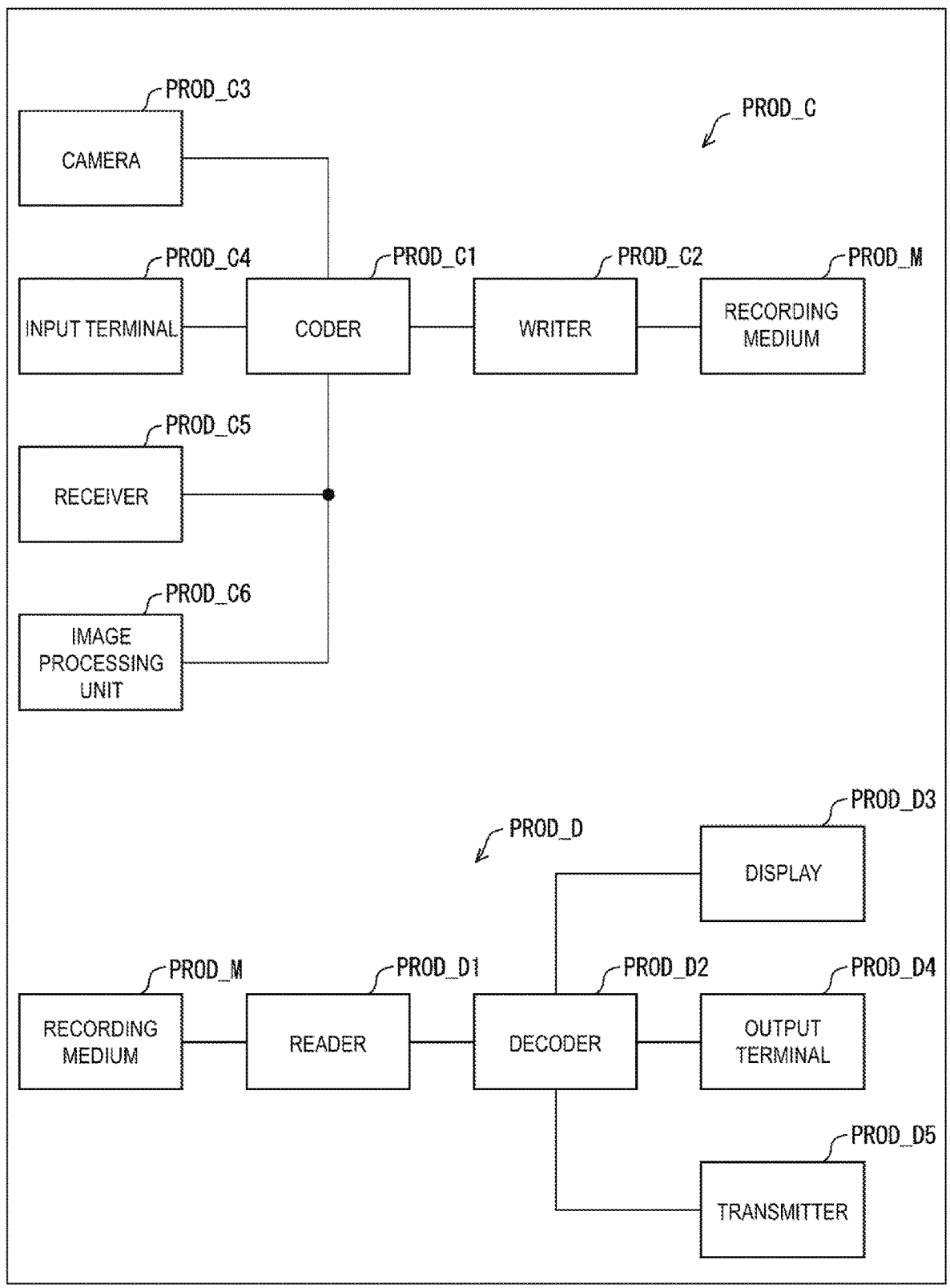
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

Next, referring to FIG. 3, it will be described that the above-mentioned video coding apparatus 11 and the video decoding apparatus 31 can be utilized for recording and regeneration of videos.

FIG. 3(a) is a block diagram illustrating a configuration of a recording apparatus PROD_C installed with the above-mentioned video coding apparatus 11. As illustrated in FIG. 3(a), the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

The recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in FIG. 3(a), some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3(b) is a block diagram illustrating a configuration of a reconstruction apparatus PROD_D installed with the above-mentioned video decoding apparatus 31. As illustrated in FIG. 3(b), the reconstruction apparatus PROD_D includes a reading unit PROD_D1 which reads coded data written in the recording medium PROD_M, and a decoder PROD_D2 which obtains a video by decoding the coded data read by the reader PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in FIG. 3(b), some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that executes a command of a program to implement each of functions, a Read Only Memory (ROM) that stores the program, a Random Access Memory (RAN) to which the program is loaded, and a storage apparatus (recording medium), such as a memory, that stores the program and various kinds of data. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

INDUSTRIAL APPLICABILITY

The embodiments of the present disclosure can be preferably applied to a video decoding apparatus that decodes coded data in which image data is coded, and a video coding apparatus that generates coded data in which image data is coded. The embodiments of the present disclosure can be preferably applied to a data structure of coded data generated by the video coding apparatus and referred to by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image decoding apparatus comprising:

a memory; and a processor, wherein the processor is configured to perform:

applying, on a per block basis, a first adaptive loop filter to a luminance image included in an input image and outputting a luminance output image;

applying, on a per block basis, a second adaptive loop filter to a chrominance image included in the input image and outputting a chrominance output image;

decoding a filter coefficient from coded data;

deriving, on a per block basis, an amount of change by using the luminance image and the filter coefficient; and deriving a modified chrominance image by adding a value obtained by clipping the amount of change within a prescribed range to the chrominance output image, wherein a threshold of the clipping depends on a bit depth.

2. An image coding apparatus comprising:

a memory; and a processor, wherein the processor is configured to perform:

applying, on a per block basis, a first adaptive loop filter to a luminance image included in an input image and outputting a luminance output image;

applying, on a per block basis, a second adaptive loop filter to a chrominance image included in the input image and outputting a chrominance output image;

decoding a filter coefficient from coded data;

deriving, on a per block basis, an amount of change by using the luminance image and the filter coefficient; and deriving a modified chrominance image by adding a value obtained by clipping the amount of change within a prescribed range to the chrominance output image, wherein a threshold of the clipping depends on a bit depth.

3. An image decoding method comprising:

applying, on a per block basis, a first adaptive loop filter to a luminance image included in an input image and outputting a luminance output image;

applying, on a per block basis, a second adaptive loop filter to a chrominance image included in the input image and outputting a chrominance output image;

decoding a filter coefficient from coded data;

deriving, on a per block basis, an amount of change by using the luminance image and the filter coefficient; and deriving a modified chrominance image by adding a value obtained by clipping the amount of change within a prescribed range to the chrominance output image, wherein a threshold of the clipping depends on a bit depth.

* * * * *